Patented Jan. 28, 1941

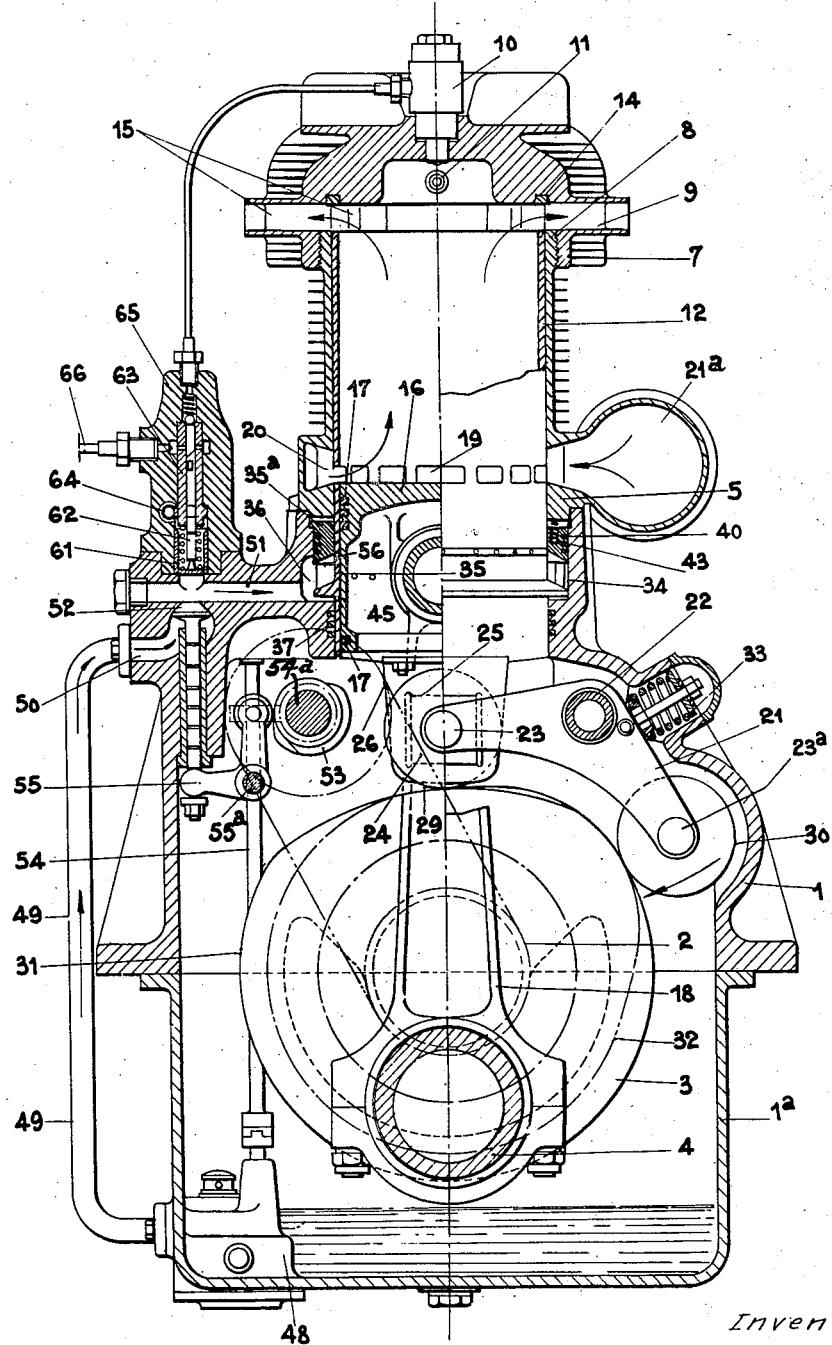

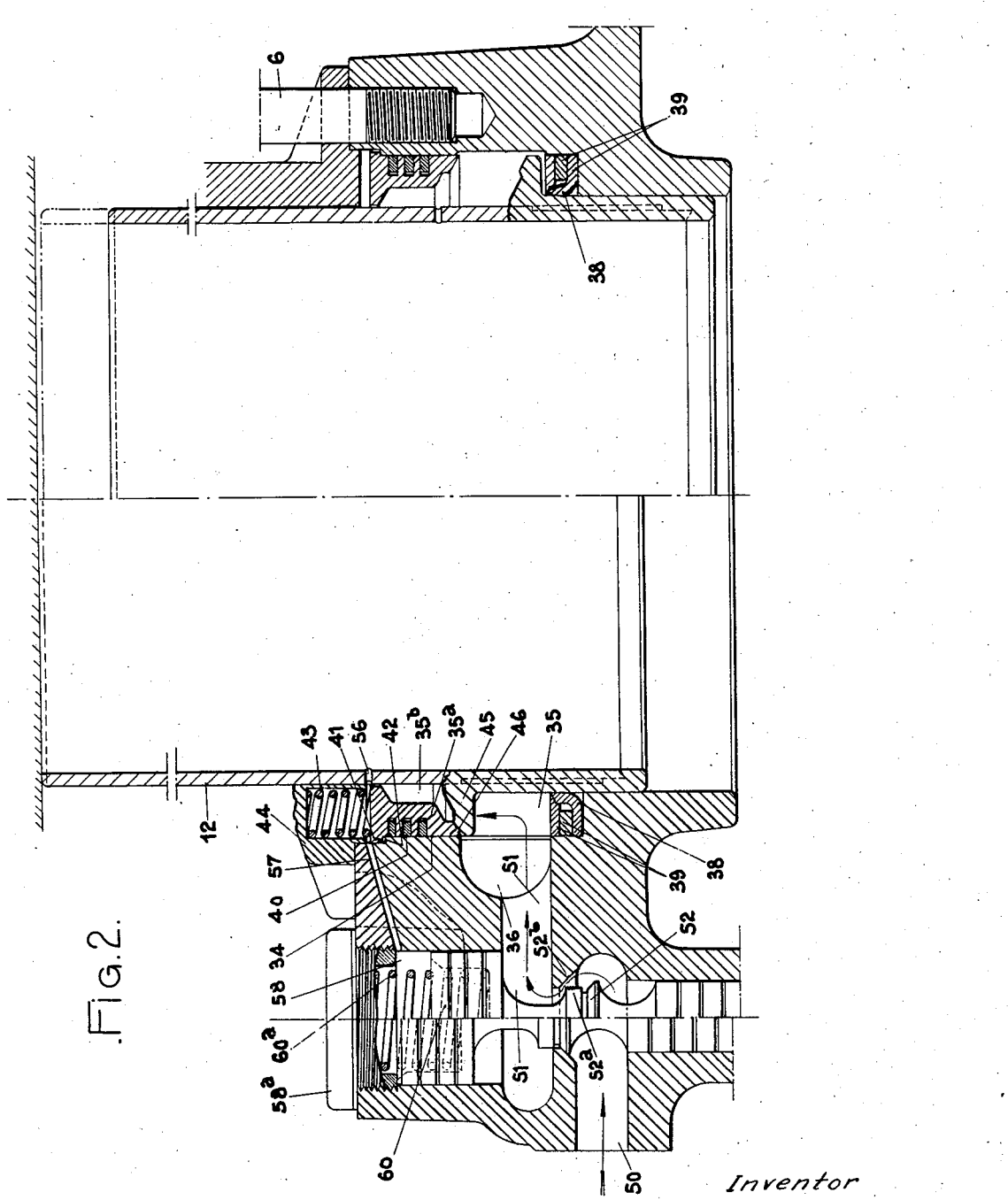

2,229,709

UNITED STATES PATENT OFFICE 2,229,709

TWO CYCLE ENGINE

Auguste Albert Honoré Tisserant, Saint-Cloud, France

Application June 2, 1938, Serial No. 211,358
In France June 2, 1937

7 Claims. (Cl. 123—65)

The present invention relates to two stroke cycle combustion and explosion engines in which the distribution is ensured by a sleeve interposed between the piston and the cylinder and which controls:

The exhaust by acting through its upper edge as an annular valve having its seat on the cylinder head;

The admission of scavenging and feed air through ports provided on the one hand in the jacket, on the other hand, in the cylinder, and through the intervention of the piston constituting slide-valve movable both relatively to the sleeve and relatively to the cylinder.

This method of distribution actually appears to be the most advantageous solution for a two stroke cycle engine. In fact, it gives satisfaction from the triple standpoint of fluid-tightness, cooling of the piston, and resistance of the sleeve to wear and to distortions, said sleeve being in fact held stationary when the lateral thrusts exerted on it by the piston reach their maximum values.

The invention takes advantage of this general arrangement, while improving it for various purposes indicated hereinafter and which constitute as many desirable industrial results.

These improvements are particularly characterized by the following points:

1. The control of the sleeve is mechanical and is ensured by two distinct cams which control the angular movements of a rocker, positively connected to the slide-valve, and the ends of which are respectively subjected to the action of said cams.

2. The profiles of the cams are so traced that, towards the end of the closing movement of the slide-valve, the latter is free, the thrust which applies it on its seat being obtained by the pressure of a fluid which, preferably, is the lubricating oil of the engine.

Thus, whatever may be the variations of the length of the sleeve and the effects of expansion on its control mechanism, it can be applied on its seat at the required instant, with all the energy necessary for obtaining satisfactory fluid-tightness.

As regards the carrying into practice of the characteristic features above set forth, the invention concerns various extremely advantageous forms of construction and particularly the following:

The pump injecting the fuel is controlled by the pressure of the fluid which applies the sleeve on its seat, this allowing the arrangement of said pump as near as desired to the injector. This result, the interest of which is obvious to those skilled in the art of injection engines, could only be obtained, with the mechanical controls of pumps, by means of complicated transmissions.

In case the fuel is maintained under a constant pressure, the injection being ensured by an injector with controlled variable outflow, the control of the injector takes place by the pressure of the fluid applying the sleeve on its seat.

In this case, advantages of the same order as those obtained with injection by means of a pump, are obtained.

The hydraulic control of the sleeve takes place by the action of the liquid under pressure on an annular base which is combined with a piston co-axial with the sleeve, but free relatively to the latter, the contact between this piston and the base of the sleeve determining the point of action of the liquid the pressure of which is at least equal to that necessary for preventing the detachment of the sleeve in the most unfavorable conditions, that is to say, assuming that the entire upper section of the sleeve is exposed to the maximum pressure provided in the combustion or explosion chamber of the cylinder.

The pressure of the liquid on the base of the sleeve can moreover be limited to this critical value so that, in case of an overpressure in the explosion or combustion chamber, the sleeve should be automatically detached for acting as a safety valve.

Other advantageous particularities of the invention are set forth in the following description relating to a form of construction of a single-cylinder injection engine having a two stroke cycle, to which are simultaneously applied all the characteristic features of the invention.

Fig. 1 of the accompanying drawings illustrates in elevation, with axial and vertical sections, a general view of the engine.

Fig. 2 is a partial elevation, on an enlarged scale, with axial sections showing the hydraulic control of the sleeve.

In this form of construction, the engine comprises a casing made in two parts 1 and 1ª in the bearings of which is centered a driving crank shaft 2 with cheek members 3 and a crank pin 4.

The cylinder 5, which is air-cooled, is secured on the upper part of the casing 1 by bolts or stud-bolts 6. It comprises a cylinder head 7 screwed at 8 and peripherally open at 9 for the exhaust. A fuel injector is provided at 10 and one or more sparking plugs at points such as 11. The distributing sleeve 12 is fitted in the cylinder without special precaution concerning fluid-tightness, as this, as will be seen later on, is not necessary at this place. The sleeve 12 constitutes an annular valve which presses on a seat 14 of the upper part of the cylinder head. It can already be seen that the latter is, in fact, constituted by a lower base screw threaded at 8 and by an upper bottom connected by cast stay members 15. These stay members can, owing to their distribution outwardly of the path followed by the sleeve, be suitably shaped and dimensioned so as not to check the flow of the burnt gases and to be cooled without risk of rupture owing to expansions. By giving a small height to the ports 9, a large section of passageway for the gases is obtained and moreover, the useful stroke of the sleeve, concerning its action as exhaust valve, is very reduced, this being obviously very advantageous for obtaining high working speeds contemplated by the invention.

The piston 16 fitted in the sleeve 12 with the usual fluid-tight packing rings 17, is connected to the crank pin 4 by the connecting rod 18 and it controls the air inlet ports 19 provided slightly below the mean region of the sleeve, that is to say, is a zone where the temperatures do not reach high values. These ports move opposite other ports 20, formed in the wall of the cylinder and in communication with an air inlet manifold 21ª, preferably under pressure.

The control of the slide-valve takes place by means of a rocker 21, journalled at 22 on the casing 1 and one of the ends of which carries a spindle 23 journalled in a slide-block or bearing 24 transversely movable in a slide 25 of a lug 26 secured to the lower edge of the sleeve. The spindle 23 and the spindle 23ª of the rocker respectively carry a roller 29 and a roller 30.

The roller 29 bears on a cam 31 and the roller 30 bears on a cam 32, both of these cams being advantageously cut on one of the cheek members 3 of the crank shaft. The rocker is moreover urged in the direction of the arrow by a spring 33.

The upper part of the casing 1 is bored at 34 to a diameter greater than that of the sleeve so as to provide about the latter an annular cavity 35 opening into cells 36 peripherally distributed and formed when casting. For ensuring the fluid-tightness of this cavity at the lower part of the sleeve 12, packing rings 37 (Fig. 1) can for instance be provided, or a pressed leather joint 38 held in place by rigid rings 39 (Fig. 2).

At the upper part of the cavity 35 is arranged an annular piston 35ª provided with fluid-tight packing rings 40 and which, by its upper base 41, abuts, in the absence of any constraint, against a seat 42 of the casing, under the action of returning springs 43 arranged in housings uniformly distributed in the flange 44 for securing the cylinder. A base 45 is provided on the sleeve which has the same diameter as the cavity 35 in which it slides, and which comprises a seat 46 which can press upon a corresponding seat of the piston 35ª.

A pump 48, of the gear type for instance, is permanently controlled by a rotary shaft 54 driven by a shaft 54ª to which it is connected by two helical gears, said shaft 54ª being coupled to the motor crankshaft 2. This pump effects a suction in the reserve of lubricating oil of the casing and delivers, through the conduit 49 into a channel 50, the communication of which, with a channel 51, permanently connected to the cavity 35, is controlled by a distributor or flap valve 52.

The positive control of the distributor 52 takes place from a cam 53 kinematically connected to the driving shaft and which, in the example illustrated, acts on a right-angle lever 55 pivoting at a fixed point 55ª.

In the case of a multi-cylinder engine, use can be made of a single pump with as many outlets as there are sleeves 12.

The operation of the engine the general arrangement of which has just been described is as follows:

After exhaust, the piston being near the low dead center, the ports 19 are uncovered and the sleeve being itself at its low dead center, its base 45 is spaced from the piston 35ª which has abutted at 42. The phase for scavenging and filling with air takes place.

When the sleeve rises under the action of cam 31, the base 45 moves without appreciable resistance in the cavity 35 of constant volume filled with oil under pressure since the distributor 52 is closed. Owing to the cells 36, the oil can pass freely on either side of the base 45. When the seat 46 of the base 45 comes in contact with the corresponding seat on the piston 35ª, a small quantity of oil remains in the cavity 35ᵇ which, for avoiding any counter-pressure, is in communication with the interior of the sleeve 12 and, consequently, of the casing, by a series of orifices 56.

In the embodiment of Fig. 2, the cavity 35ᵇ is also in communication by means of a channel 57 with a fluid-tight cylinder 58 in which a piston 60 follows the movements of the distributor 52, with which it is rigid. A spring 60ª can be interposed between the piston 60 and the bottom 58ª of the cylinder 58.

When the upper edge of the sleeve 12 is about to reach the seat 14, the distributor 52 opens for admitting the oil pressure in the cavity 35. This pressure is instantaneously established and the base 45 is subjected to a thrust which can be as important as desired; it depends, in fact, only on the delivery pressure and the surface of the base 45, that is to say, on two variables the values of which can be determined within wide limits.

The sleeve is therefore applied on its seat and held solely by the thrust of the oil owing to the expedient consisting in giving a suitable profile to the cam 32 so that, at the moment considered, the roller 30 can freely move in the direction of the arrow (Fig. 1). It may be seen that the sleeve 12 is positively coupled to the motor shaft during the most part of its stroke, due to the simultaneous contact between rollers 29 and 30 with cams 31 and 32 respectively. But this positive coupling is broken when the sleeve 12 comes near from its upper dead point, so that it is allowed to be pressed upon its seat 14 by the pressure of oil, whatever may be the thermal expansions and the wearing of surfaces the contact of which ensure the closing of the combustion chamber.

The distributor 52 remains open during the compression, combustion and expansion phases, that is to say, over about 253 degrees.

Before the beginning of the exhaust phase, the distributor 52 closes. In the example of Fig. 2 the closing first takes place through the obturating slide-valve 52ª and the sleeve 12 begins to lower with the piston 35ª restored by the springs 43.

During the common stroke of the base 45 and of the piston 35ª, the distributor 52 approaches its seat 52b with a corresponding displacement of the piston 60. This displacement is determined:

On the one hand, for discharging the pressure remaining in the chamber 35 after the closing of the latter by the slide-valve 52a, On the other hand, for compensating any increase of pressure due to the displacement of the base 45 as long as it remains in contact with the piston 35a.

The final obturation of chamber 35 is obtained by the application of the distributor 52 on its seat 52b.

It will be seen that during the operation just described, there is practically no circulation of oil which remains so to speak in a closed vessel of constant capacity. The molecular perturbations to which it is subjected are therefore very limited and it indefinitely preserves all its properties and without appreciable losses.

The stoppage of the oil pressure always takes place at the same point of the cycle whilst the putting under pressure can be adjusted at will for causing the point of closing of the sleeve to vary.

An interesting particularity of the invention, carried into practice in the embodiment shown in Fig. 1, consists in using the oil pressure exerting a thrust on the sleeve for controlling the fuel injecting pump. In this case, a piston 61 is arranged in a cylinder connected to the conduit 51 and acts on the piston of the injection pump 62. The injection pump illustrated is of the known type having a movable cylinder 63 controlled at 64 for varying the output. The ratio of the cross sections of the pistons can always be chosen for obtaining any desired injection pressure.

As indicated above, the pump barrel 65 and its fuel inlet 66 can be arranged on the cylinder head as near as possible to the injector 10, a conduit then connecting the cavity 51 and the bore in which the piston 61 moves.

Since the perfecting of special fuels having a high isooctane characteristic (95 to 100), the rates of compression can be considerably increased without having to fear the inconveniences due to the detonation phenomenon and, consequently, the consumption per hour per horse-power can be reduced to a figure approaching that of Diesel engines.

The engine described above can operate just as well with gas oil as with these special fuels. The fuel is introduced by an injector, directly in the cylinder filled with pure air to which is imparted great turbulence. The ignition is ensured electrically by magneto and sparking plugs.

But in this case a very delicate problem is set down: the constancy of the air-gasoline mixture at the different working speeds. This problem, with the engine according to the invention, is easily solved in the following manner:

As stated, the cam 32 leads the sleeve 3, for the reasons which have been mentioned, only to the neighbourhood of the seat 14 thus leaving a free passage between the latter and the sleeve during a period of time which is adjustable and which determines the real volume of the charge.

As the fuel injecting pump is controlled by the same cause as that which presses the sleeve on its seat, the compression of the air admitted in the cylinder will exactly coincide with the beginning of the injection. Consequently, by suitably combining the control of the distributor 52 and the displacements of the pump cylinders 63 which determine the fuel outflow, the proportion of gasoline and air can be rendered constant at its optimum value.

With a sparking plug for each cylinder, two injectors and their pumps, one for the gasoline, the other for a heavy fuel, such as gas oil, one can:

(a) Effect starting with gasoline and when the engine is hot shut off the gasoline and use gas oil.

(b) Run solely by using gasoline, either at reduced power with ordinary gasoline, or even at full power, if use is made of superior fuels.

The invention is not limited to the example of construction precisely described and illustrated. It is defined in its characteristic features, in the preamble to the present specification and includes in its scope all the means and combinations of means adapted to carry these characteristic features into practice.

What I claim as my invention and desire to secure by Letters Patent is:

1. A sleeve valve for fluid distribution, a cylinder, exhaust ports in the upper part of said cylinder controlled by the upper edge of said sleeve valve which is based on the seat in the cylinder head, a rocking member pivoted at a fixed point, means adapted for positively coupling the said rocking member and the sleeve, two distinct cams upon the crankshaft of the engine, a roller at each end of the rocking member into contact with the said cams respectively, a depressed part upon one of the cams in order to liberate the sleeve from its positive coupling with the crankshaft when the said sleeve reaches a point close to the upper dead point, and hydraulic means for pressing freely the sleeve against its seat.

2. A sleeve valve for fluid distribution, a cylinder, exhaust ports in the upper part of said cylinder controlled by the upper edge of said sleeve valve which is based on the seat in the cylinder head, a rocking member pivoted at a fixed point, means adapted for positively coupling the said rocking member and the sleeve, two distinct cams upon the crankshaft of the engine, a roller at each end of the rocking member in contact with the said cams respectively, a depressed part upon one of the cams in order to liberate the sleeve from its positive coupling with the crankshaft, an annular base upon the sleeve adapted to move into an annular recess of the motor casing, and a pump for forcing oil into the said recess in order to press the sleeve against its seat.

3. A sleeve valve for fluid distribution, a cylinder, exhaust ports in the upper part of said cylinder controlled by the upper edge of said sleeve valve which is based on the seat in the cylinder head, a rocking member pivoted at a fixed point, means adapted for positively coupling the said rocking member and the sleeve, two distinct cams upon the crankshaft of the engine, a roller at each end of the rocking member in contact with the said cams respectively, a depressed part upon one of the cams in order to liberate the sleeve from its positive coupling with the crankshaft, an annular base upon the sleeve adapted to move into an annular recess of the motor casing, a movable upper bottom or ring in the said recess and provided with a seat for the said annular base, resilient means for applying the said movable ring towards a stop, and a pump for forcing oil into the said recess in order to press the sleeve against its seat when it is in contact with the seat provided on the movable ring.

4. A sleeve valve for fluid distribution, a cylinder, exhaust ports in the upper part of said cylinder controlled by the upper edge of said sleeve valve which is based on the seat in the cylinder head, a rocking member pivoted at a fixed point, means adapted for positively coupling the said rocking member and the sleeve, two distinct cams upon the crankshaft of the engine, a roller at each end of the rocking member in contact with the said cams respectively, a depressed part upon one of the cams in order to liberate the sleeve from its positive coupling with the crankshaft, an annular base upon the sleeve adapted to move into an annular recess of the motor casing, a movable upper bottom or ring in the said recess and provided with a seat for the said annular base, resilient means for applying the said movable ring towards a stop, a pump adapted to be driven from the engine, a valve adapted for controlling the connection between the said pump and the said recess, and means for operating the valve in a timed relation with the crankshaft in order to force oil into the recess and to apply the sleeve against its seat when it is in contact with the seat provided on the movable ring.

5. In a combustion engine according to claim 4, a fuel pump of the reciprocating piston type for injecting fuel into the combustion chamber of the engine, a sliding member adapted to act upon the pump piston and arranged in a boring opening into the oil recess in order to operate the said pump in a timed relation with the sleeve.

6. A sleeve valve for fluid distribution, a cylinder, exhaust ports in the upper part of said cylinder controlled by the upper edge of said sleeve valve which is based on the seat in the cylinder head, a rocking member pivoted at a fixed point, means adapted for positively coupling the said rocking member and the sleeve, two distinct cams upon the crankshaft of the engine, a roller at each end of the rocking member in contact with the said cams respectively, a depressed part upon one of the cams in order to liberate the sleeve from its positive coupling with the crankshaft, an annular base upon the sleeve adapted to move into an annular recess of the motor casing, a movable upper bottom or ring in the said recess and provided with a seat for the said annular base, resilient means for applying the said movable ring towards a stop, a pump adapted to be driven from the engine, a valve adapted for controlling the connection between the said pump and the said recess, a sliding member arranged in the said recess above the said valve and positively connected to the latter, resilient means for urging the said sliding member into the recess.

7. A sleeve valve for fluid distribution, a cylinder, exhaust ports in the upper part of said cylinder controlled by the upper edge of said sleeve which is pressed on the seat in the cylinder head, coupling means pivotally carried at a fixed point of the engine casing forming a positive coupling between the sleeve and the engine crankshaft during the major part of its stroke, rotatable means carried by said crankshaft for liberating the sleeve from the said positive coupling when the said sleeve reaches a point close to its upper dead point, and means operable by said engine including a movable member and a fluid in contact with said sleeve and exerting fluid pressure against said sleeve and thereby freely pressing the same against its seat.

AUGUSTE ALBERT HONORÉ TISSERANT.